Aug. 4, 1964     B. A. DAVIES     3,142,880
CLIP FOR SECURING FLEXIBLE MATERIAL TO A CYLINDRICAL MEMBER
Filed Feb. 4, 1963

INVENTOR.
BOYD A. DAVIES
BY
ATTORNEY

United States Patent Office 3,142,880
Patented Aug. 4, 1964

3,142,880
CLIP FOR SECURING FLEXIBLE MATERIAL
TO A CYLINDRICAL MEMBER
Boyd A. Davies, West Highway 54, Pratt, Kans.
Filed Feb. 4, 1963, Ser. No. 256,014
2 Claims. (Cl. 24—265)

This invention relates to a clip for attaching flexible webbing or fabric to a rod or tubular member of a frame, and has for its principal object to provide a spring clip that is easily applied to hold the flexible material securely and which anchors itself against rotation on the tubular member responsive to pull of the material.

I am aware that clips of this character have been previously used for holding flexible material by means of prongs on the clip which are intended to bite into the material of the frame members, but they have required a specially formed frame or they have been difficult to apply. In application and in use, the prongs break off or become flattened so that they do not hold securely, consequently the clips shift on the tubular member and the flexible material soon sags. Also, the flexible material, when secured by such clips, slides laterally on the clip, and in the case of lawn furniture where the webbing is interwoven, it is difficult to retain a symmetrical pattern and the parts of the clips are exposed, making an unsightly appearance. Where the tubular members of the frame are specially shaped, special forming increases cost and necessitates a particular clip. When it becomes necessary to reweb lawn furniture, this necessitates a specially formed clip for each manufacturer's product.

Therefore, other objects of the invention are to provide a spring clip with teeth in the form of V-shaped corrugations in the metal of the clip, which not only provide rigid teeth on the inner side of the clip, but the grooves of the corrugations on the outer side of the clip prevent lateral shifting of the flexible material; to provide a simple clip that may be furnished in kit form for rewebbing of all pieces of lawn furniture where the frame is constructed of tubular material; and to provide a clip that is easy to apply.

In accomplishing these and other objects of the invention, I have provided improved structure, the preferred form of which is illustrated in the accompanying drawings, wherein.

Figure 8:
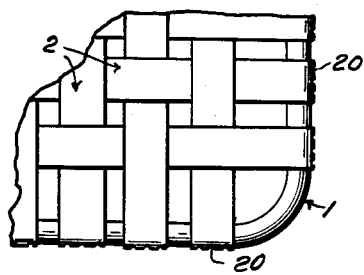
FIG. 8 is a fragmentary plan view of a portion of a lawn chair or the like, particularly illustrating the woven pattern formed by the webbing and retained by clips of the present invention.

Referring more in detail to the drawings:

1 designates a portion of a tube forming a part of the frame of an article of lawn furniture or the like, to which a webbing 2 is secured, for example, in interwoven pattern to provide a seat or backrest, as shown in FIG. 8. The webbing 2 may be of any type, but usually consists of woven plastic material that is of waterproof character, so as to withstand the elements and moisture when the article of furniture is used at the sides of swimming pools and the like for the convenience of swimmers. The frames of such furniture usually consist of thin-walled metal tubing formed of a noncorrosive metal, such as aluminum or aluminum alloy, and having a wall thickness of ample strength to provide a resilient frame and for securing the ends 3 of the webs 2.

Figure 1:
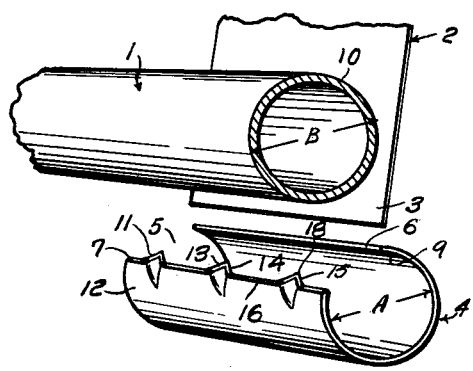
FIG. 1 is a perspective view of a tubular member which may form a part of the frame of an article of lawn furniture, a portion of a strip of webbing, and a spring clip constructed in accordance with the present invention, the three elements being shown in spaced apart relation to better illustrate the construction of the clip.
Figure 2:
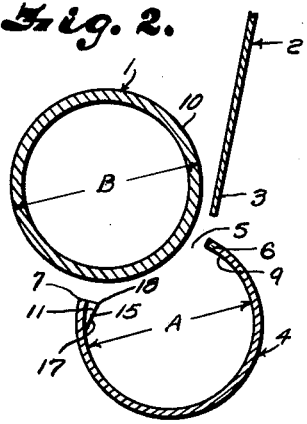
FIG. 2 is an enlarged cross section through the parts shown in FIG. 1, and also in spaced apart relation.
Figure 4:
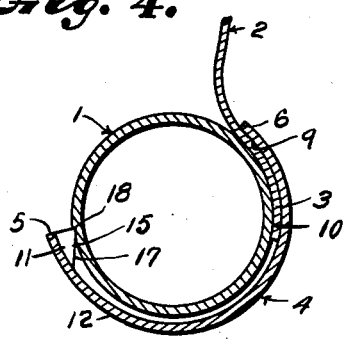
FIG. 4 is an enlarged section taken on the line 4—4 of FIG. 3.
Figure 3:
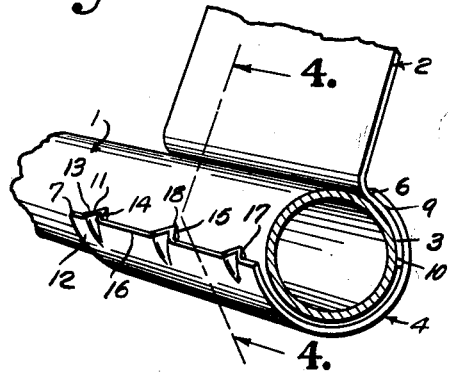
FIG. 3 is a perspective view of the parts with a clip applied to secure the webbing to the tubular element of the frame.

In accordance with the present invention, the webs are secured by spring clips 4, of C shape and of a length substantially conforming to the width of the webbing 2. Each clip 4 is formed of a single strip of spring metal which is blanked to size and rolled to C shape, so that in relaxed position of the metal the inner diameter "A" is somewhat smaller than the outer diameter "B" of the tubing to which it is to be applied, and the transverse opening 5 at the front of the C clip is of less height than the outer diameter "B" of the tubing, so that the longitudinal edges 6 and 7 thereof extend beyond the vertical diameter of the tubing when applied thereto, as shown in FIG. 4.

Figure 7:
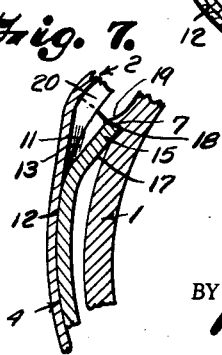
FIG. 7 is a greatly enlarged fragmentary section showing the bite of the teeth of the clip into the metal of the tube.

The inner face 9 along the edge 6 of the clip is smooth and cooperates with the outer cylindrical face 10 of the tubing 1 to clamp an end 3 of the web 2 therebetween. The edge 6 produces a bight 8 in the web when the web is pulled thereover, as later to be described. The opposite edge 7 of the clip 4 has a plurality of substantially V-shaped spaced apart corrugations 11, struck inwardly from the outer face 12 of the metal to provide corrugations having inwardly converging sides 13 and 14, terminating in a V-shaped tooth 15 that is offset from the portions 16 of the edge 7 which are intermediate the corrugations 11. The bottoms of the corrugations 11 converge from the teeth 15 to merge into the metal that composes the body of the clip, to provide a brace-like support 17 of the teeth 15 to retain the form thereof, so that when the clip is applied the points 18 are backed for the full circumferential length of the bottoms of the corrugations, as best shown in FIG. 7.

Figure 5:
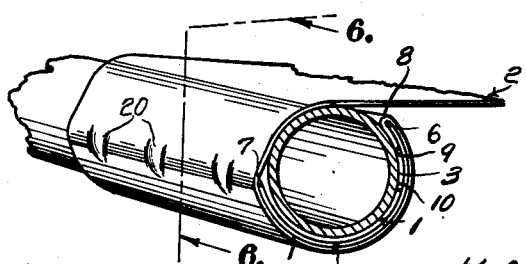
FIG. 5 is a perspective view showing the web extended about the clip and the pulling of the web into the grooves of the corrugations that form the teeth of the clip.
Figure 6:
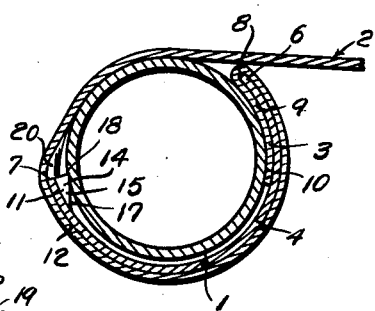
FIG. 6 is an enlarged section taken on the line 6—6 of FIG. 5.

In using the spring clips 4 for securing the ends 3 of the web to the frame member 1, the end 3 of a web is placed in tangential contact with the face 10 at the underside of the tubing 1, and the portion 9 of the clip is placed thereagainst, with the ends of the clip centered with respect to the width of the web. The opposite edge 7 of the clip is sprung over the opposite side of the tubing 1 and released, so that the spring pressure sets the points 18 of the teeth 15 into the metal to provide abutments 19 on the tubing, as shown in FIG. 7. The web 2 is then extended over the smooth edge 6 of the clip, to form the bight 8 therein, and continued over the outer face of the clip to overlie the corrugations 10, whereby the stretch on the web causes the web to draw into the grooves of the corrugations, as shown at 20 in FIG. 5.

The cutting of the teeth into the metal of the tubing prevents turning of the clip on the tubing, and when weight is applied to the webs of the chair, gripping of the teeth is enhanced more firmly to anchor the clips and assure that the webs remain in taut condition and do not loosen with use.

It is obvious that the V-shaped formation of the corrugations eliminates flattening out or breaking off of the teeth, and that the corrugations provide strength in a circumferential direction to assure that the teeth bite firmly and grip the tubing.

It is also to be noted that the clips are concealed by the webs and that pull of the webs into the grooves of the corrugations prevents lateral sliding of the webs on the clips.

It is obvious that the clips, constructed as described, may be used for applying the original web by the manufacturer of the furniture, or the clips may be sold and purchased as kits when it is necessary to reweb the seats and backs of such furniture.

What I claim and desire to secure by Letters Patent is:

1. A clip for securing flexible material in lapped relation about a side of a cylindrical member, said clip comprising a C-shaped body of resilient sheet metal having a diameter to clamp about the cylindrical member and having a smooth marginal inner face extending along one edge to clamp an end of the flexible material to the cylindrical member for the flexible material to exert a rotative force on the clip when the flexible material is extended in a bight over said one edge and around the clip to extend from the opposite edge, means on the clip for gripping the cylindrical member to anchor the clip thereto under pull of the flexible material, and means on the outer face of the clip for preventing lateral movement of the flexible material on the clip.

2. A clip for securing flexible material in lapped relation about a side of a cylindrical member, said clip comprising a C-shaped body of resilient sheet metal having a diameter to clamp about the cylindrical member and having a smooth marginal inner face extending along one edge to clamp an end of the flexible material to the cylindrical member for the flexible material to exert a rotative force on the clip when the flexible material is extended over said one edge in a bight around the clip to extend over the opposite edge, said opposite edge of the clip having a series of spaced apart corrugated portions extending completely from the inner face of the clip for providing teeth for gripping the cylindrical member to anchor the clip thereto under pull of the flexible material, and said corrugations providing grooves in the outer face side of the clip and into which the flexible material draws to resist lateral movement of the flexible material on the clip.

References Cited in the file of this patent

UNITED STATES PATENTS

| | | |
|---|---|---|
| 2,461,103 | Amis | Feb. 8, 1949 |
| 2,686,033 | Keiter | Aug. 10, 1954 |
| 3,084,739 | Jaworski | Apr. 9, 1963 |